(12) United States Patent  
Sethuraman et al.

(10) Patent No.: US 8,401,593 B2  
(45) Date of Patent: Mar. 19, 2013

(54) ENABLING SPEAKER PHONE MODE OF A PORTABLE VOICE COMMUNICATIONS DEVICE HAVING A BUILT-IN CAMERA

(75) Inventors: Anand Sethuraman, Sunnyvale, CA (US); E-Cheng Chang, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/407,589

(22) Filed: Feb. 28, 2012

(65) Prior Publication Data

US 2012/0157161 A1   Jun. 21, 2012

Related U.S. Application Data

(62) Division of application No. 12/234,475, filed on Sep. 19, 2008, now Pat. No. 8,131,322.

(51) Int. Cl.
*H04M 1/00* (2006.01)

(52) U.S. Cl. ............ 455/569.1; 455/550.1; 455/556.1; 455/557; 379/420.01; 379/420.02; 379/420.03

(58) Field of Classification Search ........... 455/556.1, 455/569.1
See application file for complete search history.

(56) References Cited

U.S. PATENT DOCUMENTS

| | | | |
|---|---|---|---|
| 6,122,366 A | 9/2000 | Veschi | |
| 7,738,857 B2* | 6/2010 | Engstrom et al. | 455/411 |
| 2005/0009562 A1 | 1/2005 | Kikkawa | |
| 2005/0212760 A1 | 9/2005 | Marvit et al. | |
| 2006/0052109 A1* | 3/2006 | Ashman et al. | 455/440 |
| 2006/0169021 A1* | 8/2006 | Silverstein | 73/1.37 |
| 2007/0075965 A1 | 4/2007 | Huppi et al. | |
| 2008/0140868 A1 | 6/2008 | Kalayjian et al. | |
| 2008/0146289 A1 | 6/2008 | Korneluk et al. | |
| 2008/0212753 A1 | 9/2008 | Yoshizawa | |
| 2009/0117951 A1* | 5/2009 | Alameh et al. | 455/575.1 |
| 2009/0197615 A1* | 8/2009 | Kim et al. | 455/456.1 |

* cited by examiner

*Primary Examiner* — Charles Appiah  
*Assistant Examiner* — Mazda Sabouri  
(74) *Attorney, Agent, or Firm* — Blakely, Sokoloff, Taylor & Zafman LLP (57) ABSTRACT

Apparatuses and methods of using a speaker phone mode of a portable voice communications device having a built-in camera are described herein. In one embodiment, the speaker phone mode is activated if it is determined that an image captured by the device is black or nearly black, which indicates that the device is placed flat or nearly flat against surface. In one embodiment, the speaker phone mode is activated based on the results of comparing the captured image to a plurality of previously stored captured images wherein the previously stored captured images include images captured by the device in situations where it would be desirable for the speaker phone mode to be activated. In one embodiment, the speaker phone mode is activated based on a comparison of a captured image and previously stored captured images and their respective speaker phone mode statuses. Other embodiments are also described.

11 Claims, 5 Drawing Sheets

ENABLING SPEAKER PHONE MODE OF A PORTABLE VOICE COMMUNICATIONS DEVICE HAVING A BUILT-IN CAMERA

This application is a divisional of co-pending U.S. application Ser. No. 12/234,475 filed on Sep. 19, 2008 now U.S. Pat. No. 8,131,322.

FIELD

Embodiments of the invention relate to the enabling of speaker phone mode in a portable voice communications device having a built-in camera. Other embodiments are also described.

BACKGROUND

As their popularity increases, portable or mobile electronic devices such as cellular phones have been growing in complexity. In addition to supporting wireless voice communications, devices, such as the iPhone® multifunction device by Apple Inc., may feature a built-in digital camera to capture and playback video or still images.

Many cellular telephone devices today also feature a speaker phone that is activated manually by its user. The speaker phone allows the user to continue with a cellular telephone conversation without having to hold the device to his ear. In other words, the speaker phone allows the user to use the device in a "hands-free" manner.

For example, a user who is busy working on a computer at the office can leave his cellular telephone device on his desk and manually activate the speaker phone to receive calls. Using the speaker phone, the user is able to carry on with his work on the computer (i.e., typing on the keyboard or manipulating the mouse).

In another example, a user who is driving a car needs to operate his cellular telephone device in a hands-free manner. Accordingly, the user can manually activate the speaker phone on his cellular device and place the device at a proximate location such as, for example, in the cup holder, In this manner, the user can have a cellular telephone conversation in the car while operating the ear using both his hands.

SUMMARY

Methods and apparatuses to use a speaker phone mode of a portable voice communications device (or "mobile device") having a built-in camera are described.

In one embodiment, the speaker phone mode is automatically activated if the device determines that an image captured by it is black or nearly black, which indicates that the device or its camera lens is likely placed flat or nearly flat against an opaque surface. In this embodiment, a method to enable the speaker phone mode using the built-in camera of the device starts by receiving or placing a call using the device, while the device is not connected to a headset. One or more images are captured using the camera, while receiving or placing the call. The image is then analyzed to determine if the image is black or nearly black. The speaker phone mode of the device is activated either automatically or by user interaction based on having determined that the image is black or nearly black.

In one embodiment, the speaker phone mode is activated based on the results of comparing the captured image to several previously stored captured images, which are images captured by the device in situations where it would be desirable for the speaker phone mode to be activated (e.g., the camera is lying on a glass or transparent table and it captures an image of the user's feet or legs that are under the table). Based on the results of the comparison (indicating that the device is in an appropriate position or location), the speaker phone mode of the device is activated for the call. In another embodiment, the captured image is analyzed to determine if the image has essentially no edges, which indicates that the camera lens of the device is very close to an opaque surface, and if so then speaker phone is enabled.

In one embodiment, the device is trained or learns about the different situations in which speaker phone mode is used. The device determines a speaker phone mode status, which indicates whether the speaker phone mode is activated, at the time an image is captured. The speaker phone mode status and the captured image are associated with each other and stored in a library or catalog. The catalog is then built, in this manner, to contain a number of different captured images and their respective speaker phone mode status. Using the catalog, the device can then determine whether to activate the speaker phone mode in any given situation. For example, whenever a call is received or placed, the device may automatically capture an image using the camera while receiving or placing the call. If the image matches (e.g., is sufficiently similar to) one of the previously stored images in the catalog, the device will automatically activate the speaker phone mode (according to the speaker phone mode status associated with the previously stored image with which there is a match). For instance, the catalog may include images of the interior of the user's car, the inside of the user's hand, behind a cup holder, and the side of the user's face, and other situations where speaker phone mode was being used.

The decision to automatically enable the speaker phone mode may be informed by also considering the level of ambient light outside the device. For example, the user might be in a dark room or outside at night time when an incoming call is received. It may not be advisable in that case to automatically initiate the speaker phone mode (even though the captured image in that case is essentially black, due to the darkness). To prevent such an occurrence, the decision to automatically enable speaker phone mode is not made unless a minimum level of ambient light is present. In certain embodiments, the device includes a separate ambient light sensor (ALS) to obtain knowledge of ambient light levels, independent of the camera image capture sensor.

In another embodiment, the movements of the device may be a factor in deciding whether to automatically enable the speaker phone. For example, the user may be walking with the device in his bag. In this situation, although the captured image may be black or nearly black, the speaker phone mode should not be activated while the device is for example undergoing short, rapid movements. In certain embodiments, the decision can be aided further in this manner by devices that include a sensor(s) for detecting such movement (e.g., an accelerometer), position, and/or orientation.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous spec die details are set forth. However, it is understood that embodiments of the invention may be practiced without these specific details. In other instances, well-known circuits, structures, and techniques have not been shown to avoid obscuring the understanding of this description.

The following description is the divided into three parts. Part I gives a brief overview of the mobile communications device in which an embodiment of the invention may be implemented. Part II describes methods of enabling the speaker phone mode of the mobile device during a call. Part III provides methods of building a library or catalog of previously captured images that are associated with different instances of speaker phone mode usage.

I. Overview of a Mobile Communications Device

Figure 1:
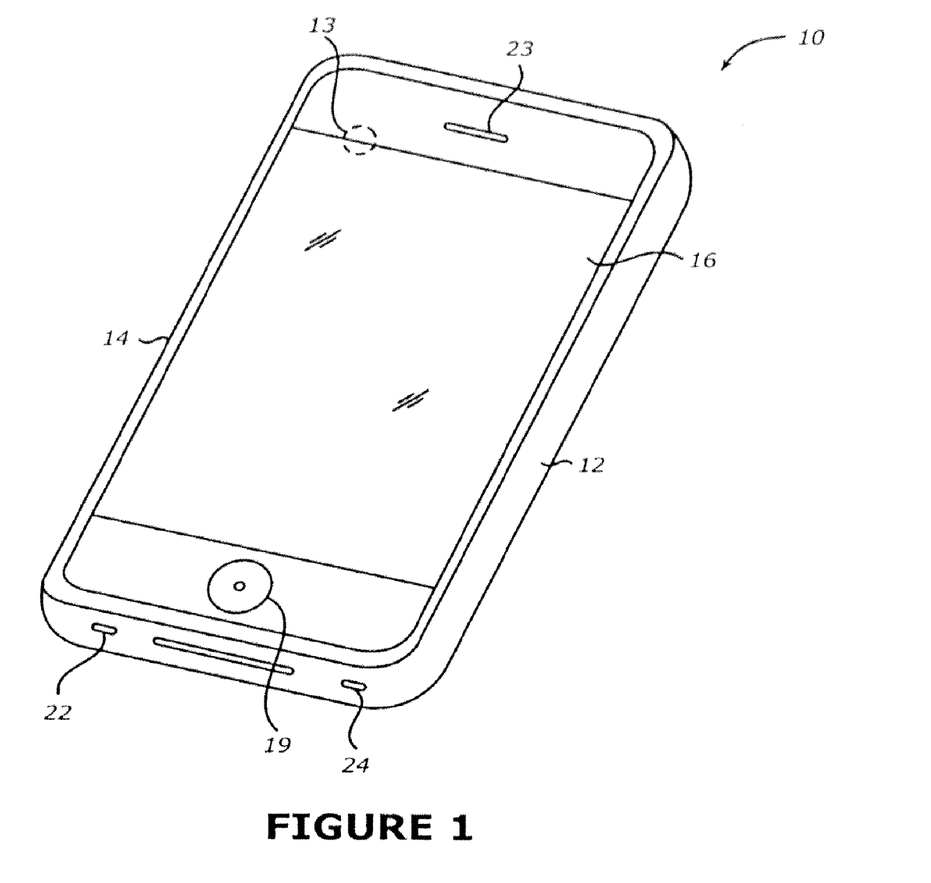
FIG. 1 shows a perspective view of an illustrative mobile device in which an embodiment of the invention may be implemented.

FIG. 1 shows an illustrative mobile communications device 10 in which an embodiment of the invention may be implemented. Device 10 may include a housing 12 having a bezel 14. The bezel 14 may be used to hold a display screen 16 on the front face of the device 10. The display screen 16 may also include a touch screen. Device 10 may also include one or more physical buttons and/or virtual buttons (on the touch screen). In one embodiment, button 19 is a physical button that when actuated by the user brings a graphical user interface of the device to its home or main menu, as performed by an iPhone® device for example. The home menu includes a launch icon for a camera application. Once launched by the user, the camera application enables a viewfinder on the display screen 16, together with a virtual shutter button allowing the user to control the functionalities of a camera built into device 10. A camera lens 13 is located in this example on the back face of device 10. When using the camera, the user may aim the camera lens 13 towards a scene in which there are objects whose images are to be captured, preview the picture to be taken by the camera using the electronic view finder on the display screen 16, and take the picture by clicking on the virtual shutter button.

Device 10 may also include input-output components such as ports and jacks. For example, opening 22 may form the microphone port and opening 24 may form a speaker port (in use when the speaker phone mode is enabled). When the speaker phone mode is not enabled, the sound during a telephone call is emitted through opening 23 which may form a speaker port for a telephone receiver that is placed adjacent to the user's ear during a call. Device 10 may include a headset jack (not shown) and a wireless headset interface, to connect with a headset device.

Figure 2:
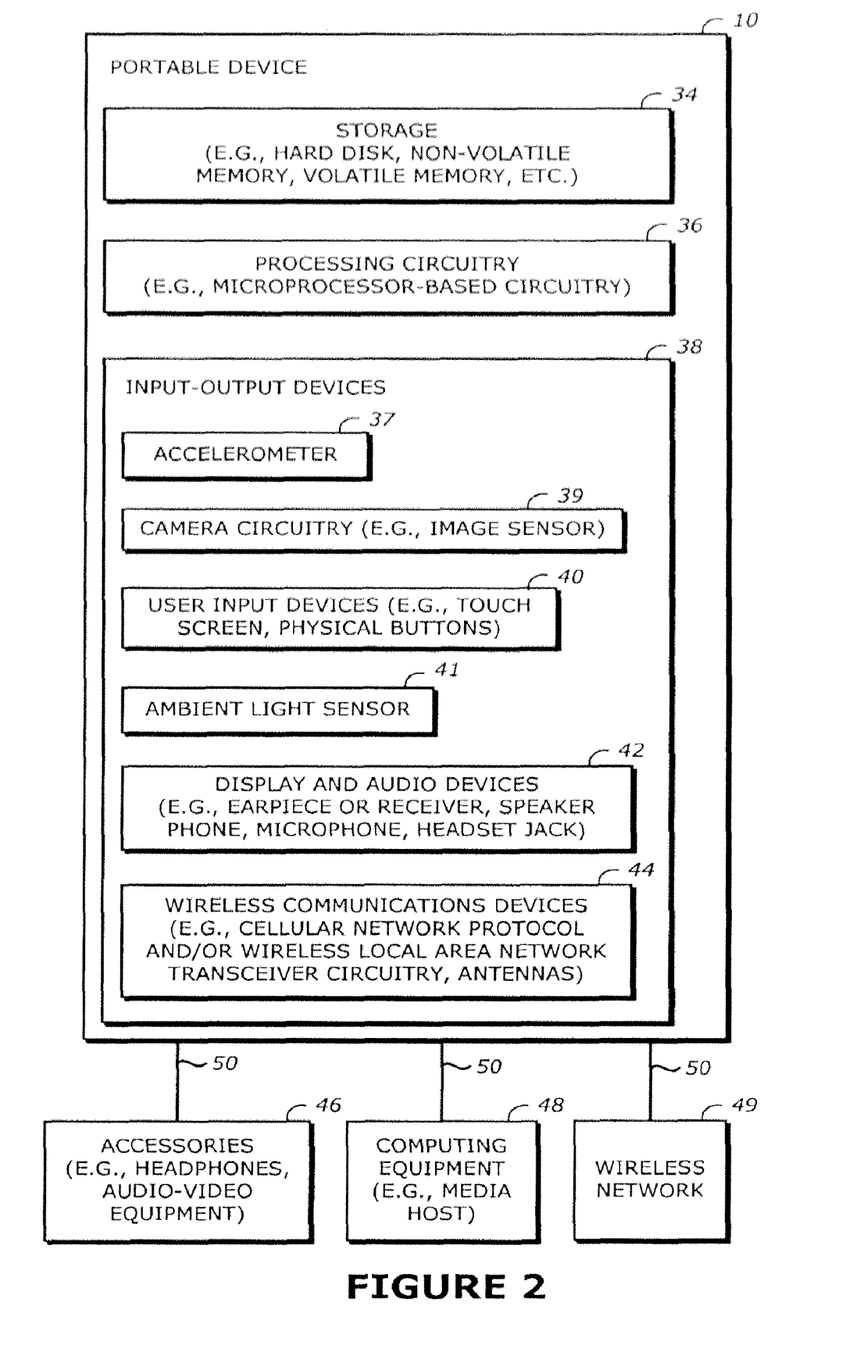
FIG. 2 shows a block diagram of the example mobile device.

Referring to FIG. 2, a block diagram of the example mobile device in which an embodiment of the invention may be implemented is depicted. However, it is noted that not every embodiment of the invention requires the entire architecture as illustrated in FIG. 2. As shown in FIG. 2, device 10 may include input-output devices 38, processing circuitry 36, and storage 34.

Input-output devices 38 allow the device 10 to receive data as well as provide data. In one embodiment, input-output devices 38 may include user input-output devices 40, display and audio devices 42, and wireless communications devices 44.

Using the user input-output devices 40, the user may supply commands to control the operations of the device 10. In one embodiment, the user input-output devices 40 include a camera, a display screen 16, a button 19, a microphone port 24, a speaker port 24, and a speaker port 23 (used as a close to the ear receiver port).

The camera includes camera circuitry including, for instance, an image sensor to capture digital images. In one embodiment, the device 10 may also include a separate ambient light sensor ("ALS"). The ALS is used to evaluate lighting conditions of the external environment around the device 100. Accordingly, the device 10 is capable of sensing ambient light and capturing images. The output of the ALS may be a value or level of ambient light (e.g., visible ambient light) received by processing circuitry 36. As described in further detail below, the speaker phone mode may be automatically activated based on the output of one or more ALS.

In one embodiment, the device 10 may also include an accelerometer 41 being coupled to the processing circuitry 36. The accelerometer 41 is a sensor that can detect movement or changes in orientation of the device. For example, the accelerometer 41 may detect that the device has remained stationary for an extended period of time.

Input-output devices 38 may include display and audio devices 42. Display and audio devices 42 may contain audio-video interface equipment such as jacks and other connectors for external devices. For example, the device 10 may include a headset jack to receive a headset plug.

Input-output devices 38 may also include wireless communications devices 44 having communications circuitry such as radio frequency (RF) transceiver circuitry, antennas, etc. In one embodiment, the microphone port 24, the speaker ports 23 and 24, as well as the headset jack may be coupled to the communications circuitry to enable the user to participate in wireless telephone or video calls that allow or support wireless voice communications. A wireless voice call that uses the wireless communications devices 44 may be a voice-only call or a voice-and-video call that has been placed to or received from any one of a variety of different wireless communications networks and in accordance with any one of several different call protocols. These include: a cellular mobile phone network (e.g., a Global System for Mobile communications, GSM, network), including current 2G, 3G and 4G networks; and an IEEE 802.11 network (WiFi or Wireless Local Area Network, WEAN) which may support wireless voice over internet protocol (VOIP).

The processing circuitry 36 included in device 10 may include a processor, such as a microprocessor, a microcontroller, a digital signal processor, or a central processing unit, and other needed integrated circuits such as glue logic. The term "processor" may refer to a device having two or more processing units or elements, e.g. a CPU with multiple processing cores. The processing circuitry 36 may be used to control the operations of device 10. For example, the processing circuitry 36 may be coupled to the communications circuitry and executes software to control the wireless communications functionality of device 10 (e.g., initiating an outgoing call or answering an incoming call) and camera functionality of the device (e.g., activating the image sensor and signaling the actuation of the shutter button). In some cases, a particular function may be implemented as two or more pieces of software that are being executed by different hardware units of a processor.

In one embodiment, the processing circuitry 36 is coupled to the camera circuitry. The processing circuitry 36 may receive in data from the sensors in the camera circuitry and perform the analysis of that data, as described below. For example, the data may be analyzed through an artificial intelligence process or in the other ways described herein. As a result of that analysis, the processing circuitry 36 may then cause the speaker phone mode to be automatically activated. The term "automatically" may describe a cause and effect relationship, such as where something is altered, changed, or set without receiving a user input or action directed at the altered or changed result. In some cases, the term "automatically" may describe a result that is a secondary result or in addition to a primary result according to a received user setting or selection.

In one embodiment, the processing circuitry 36 is also coupled to the storage 34. The storage 34 stores instructions (e.g., software; firmware) which may be executed by the processing circuitry 36. In one embodiment, the processing circuitry 36 and storage are used to run camera and telephony software applications on device 10. In one embodiment, when the instructions stored in storage 34 are executed by the processing circuitry 36, the processing circuitry 36 may determine to activate the speaker phone mode. The storage 34 may include one or more different types of storage such as hard disk drive storage, nonvolatile memory, and volatile memory such as dynamic random access memory.

Device 10 can communicate with external devices such as accessories 46, computing equipment 48, and wireless network 49, as shown by paths 50 and 51. Paths 50 include wired and wireless paths while path 51 may be a wireless path. Accessories 46 may include headphones (e.g., a wireless cellular headset or audio headphones). Wireless network 49 may include any suitable network equipment such as cellular telephone base stations, cellular towers, wireless data networks, computers associated with wireless networks, etc.

Part II: Enabling Speaker Phone Mode

The following embodiments of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc.

Figure 3:
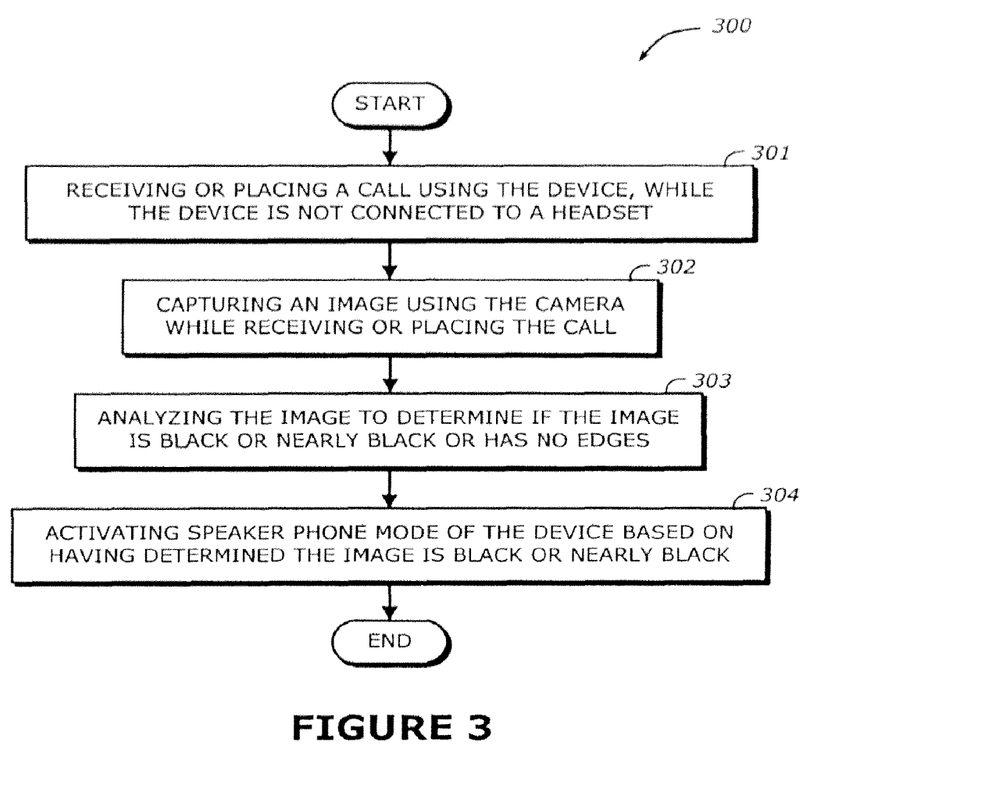
FIG. 3 shows a flow chart of one embodiment of a method of enabling speaker phone mode of the mobile device during a call.

A flowchart of one embodiment of method 300 for using speaker phone mode of the mobile device during a call is shown in FIG. 3. Method 300 begins by receiving or placing a call using the device while the device is not connected to a headset (Block 301). Typically, when a calling party places a call to the device, the device will signal to the user that a call is being received. The device may alert the user of the incoming call in various ways including emitting a ring tone, vibrating, and displaying alternating colors on the display screen. In order to place a call, using the numbered keypad on the device, the user typically dials a number which identifies the callee device. Once the user enters the number, the user will hear a ringing tone in the receiver which signifies that the call is being placed but the callee has not yet answered.

At Block 302, while receiving or placing the call and if the absence of a headset connection (either wired or wireless) has been detected, an image is captured using the camera (Block 302). If the call is being received, the image may be captured while the device alerts the user of the incoming call or at the moment when the call is answered/accepted. If the call is being placed, the image may be captured while dialing the destination number or while the call is connecting or when the call connected. To save power, the camera may remain deactivated until receiving or placing the call at which point it is automatically activated or powered-up. Once activated, the camera takes one or more pictures and then, the camera may be automatically deactivated, prior to the call being disconnected, again to save power.

At Block 303, the captured picture or image is then analyzed to determine if the image is black or nearly black (Block 303). If the device is laying flat against an opaque surface, the lens of the camera which is located on the back face of the device is close up against the opaque surface, such that little, if any, measurable/sense-able light reaches the lens. Accordingly, the image captured by the camera circuitry is in that case black. If the device is not lying entirely Oat against the opaque surface, but rather at a small angle, some light will reach the lens, and the image captured might be nearly black. The captured image might display some colored (non-black) regions, but will likely not have any edges. Next, at Block 304, the speaker phone mode of the device is activated for the call, based on having determined that the image is black or nearly black or essentially edge-free (Block 304).

In certain situations, whether or not to enable the speaker phone mode may depend on the level of ambient light surrounding the device. For example, it may not be advisable for the speaker phone mode to be automatically initiated if the user is in a dark room or outside at nighttime (because the captured image is nearly black in those instances). To prevent such an occurrence, the decision to automatically enable the speaker phone mode may not be made unless there is a minimum level of ambient light present in some embodiments.

In one embodiment, the real lighting conditions in the environment surrounding the device is determined by measuring the ambient light intensity using one or more ambient light sensors (ALS). The camera circuitry may include an ALS that may be separate from or integrated with the focal plane sensor. The device may also have an ALS that is not associated with the camera circuitry directly.

In one embodiment, if the image is determined to be black or nearly black, the ambient light data is obtained using ALSs. If the ambient light data indicates very low levels of light, the speaker phone will not be activated because the device may not necessarily be laying flat or nearly flat against a surface but rather the device may be located in a dark environment. In contrast, if the ambient light data indicates normal levels of light, the speaker mode is automatically activated, because it is likely that the device is laying flat or nearly Hat against an opaque surface.

The decision to turn on speaker phone mode may be aided further based on a combination of other data points. These data points may include some or all of the following (that have been mentioned above); black or nearly black image; image has no edges; captured sequence of images indicate non-changing scene; ALS output and the level of ambient light in the outside environment; accelerometer output and the amount of movement by the device (e.g., device is motionless); location information (from a GPS or other location determining components within the device) and time of day. Additionally, a user may program the device to enable speaker phone mode automatically in different use cases that are indicated by these and other data points. The data points may be processed/combined in linear, weighted, probabilistic, statistical or neural network type of analyses to arrive at the automatic speaker phone decision.

In some embodiments, the ambient light data may indicate very low levels of light. A lack of ambient light in addition to a determination that it is daytime (e.g., by checking a clock function of the device) indicate the device may be in a dark environment such as inside a purse or coat pocket. Accordingly, such data points could be combined to decide that the speaker phone mode not be activated.

As discussed above, in one embodiment, if the captured image has essentially no edges, the lens of the camera is likely very close to but perhaps not flat against an opaque surface. In one embodiment, if the captured image is determined to have essentially no edges, the captured image is then compared to images captured by the device in situations where it would be desirable for the speaker phone mode to be automatically activated, or where speaker phone mode was in fact enabled during a call. Thus, the decision to enable the speaker phone mode may be further informed by the result of this comparison. This embodiment is further discussed in reference to FIG. 4.

Figure 4:
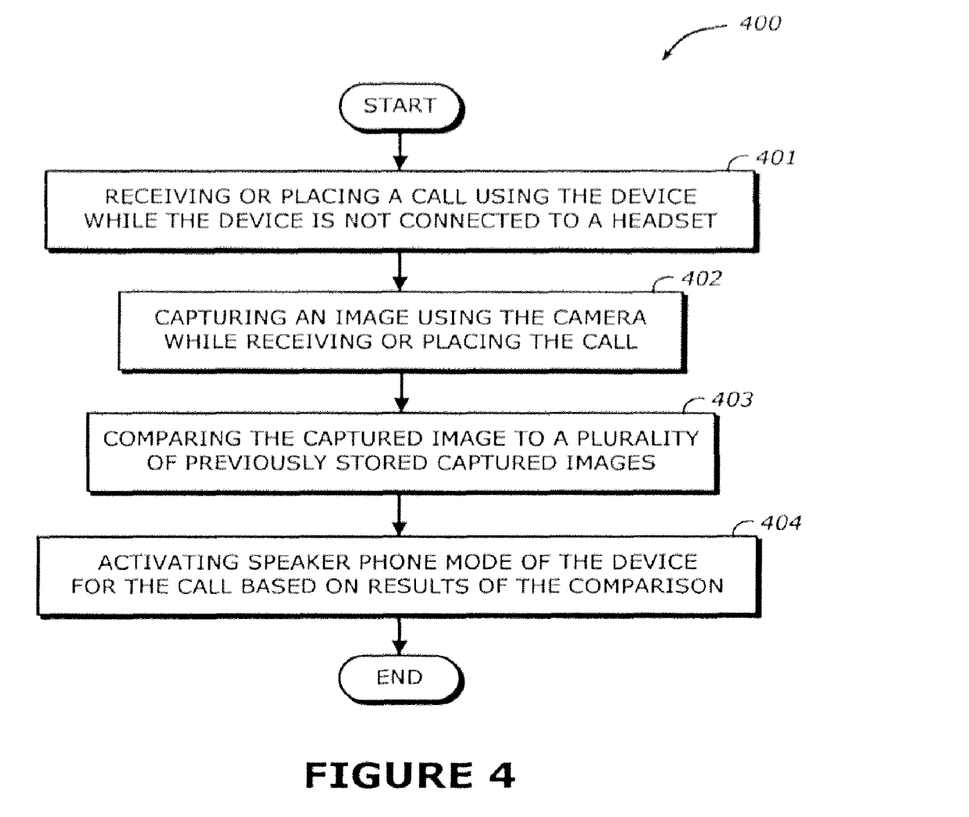
FIG. 4 shows a flow chart of another embodiment of a method of enabling speaker phone mode of the mobile device during a call.

Referring to FIG. 4, as in method 300, the method 400 starts, at Block 401, by receiving or placing a call using the device, while the device is not connected to a headset. A Block 402, if it has been detected that there is no connected headset, an image is captured using the camera while receiving or placing the call. At Block 403, the captured image is compared to previously stored captured images in a catalog. By comparing the captured image to the previously stored captured images, a determination is made as to whether one or more portions of the captured image sufficiently matches any portion of the previously stored captured images. For example, one or more of the previously stored captured images in the catalog may have been captured while the camera lens of the device was placed flat or nearly flat against a surface top. In that case, the device may be effectively "trained" to recognize when it is placed flat or nearly flat against a surface top of any color such that it would be desirable for the speaker phone mode to be automatically activated. As another example, one or more of the previously stored captured images in the catalog may have been captured while the camera lens of the device was placed against a glass or transparent table (a position in which speaker phone is typically enabled during a call). For example, the device may have captured images of the user's feet or legs that are under the table. Although the translucent or transparent surface will not block light from reaching the lens of the camera, a comparison between the captured image and these previously stored captured images will allow the device to recognize that the camera lens is likely very close to a glass or transparent table top, such that the speaker phone mode should be enabled. In this manner, the device is trained to recognize when the camera lens of the device is likely very close to a glass or transparent table lop. The user of the device can also train the device by capturing the images indicative of when speaker phone mode should be activated, thereby introducing and utilizing the user's specific preference or use ease.

Next, at Block 404, the speaker phone mode of the device is activated based on the results of the comparison. In other words, if there is a sufficient match established at Block 404, the speaker phone mode is automatically activated.

The decision to enable the speaker phone mode may be further informed by considering the movements of the device. For example, if the captured image is determined to be black or nearly black or edge-free (Method 300) or if the captured image sufficiently matches any portion of the previously stored captured images (Method 400), and the device has been stationary for a period of time preceding an incoming call, it is likely that the device is not being worn by a user and instead has been placed flat or nearly flat against or very close to a fixed surface. For this embodiment, the device 10 may use a built-in or integrated accelerometer to detect the movements of the device. The accelerometer further confirms that the device is motionless, and therefore that it is likely placed flat against a fixed surface such that the speaker mode should be activated. Accordingly, in methods 300 and 400, the device may further record data output by the built-in accelerometer, and activates the speaker phone mode based on the recorded data output. In one embodiment, the data output by the accelerometer indicates whether the camera has remained stationary for an extended period of time, such as at least one minute preceding an incoming call. In one embodiment, whether the speaker phone mode is activated is dependent on the period of time for which the device remained stationary. For example, if a device is left on a table, it is likely that it would be stationary for at least thirty seconds. If the accelerometer detects that the device was stationary for merely one or two seconds, it is not likely that the device was left lying on a table. If the device is merely stationary for a few seconds, the device could be, for example, inside a pocket or purse on a user's person who is momentarily not moving. In that case, it may not be desirable for the speaker phone mode to be activated automatically as the user will likely want to pick up the device in hand, to answer the incoming call.

On certain devices, the camera lens is positioned near a curvature of the device housing, so that in most instances the captured image is not black/dark even though the device has been placed on an opaque table with the lens facing down. In such embodiments, the accelerometer detects the camera has remained stationary for an extended period of time and the captured image taken at Block 402 is analyzed to determine if the image has essentially no edges. Alternatively, the accelerometer detects that the camera has remained stationary for an extended period of time and a sequence of images captured by the camera are analyzed to determine whether the images are nearly identical. If the images are nearly identical, the camera is determined to be capturing a non-changing scene. In both cases, Block 402 may be used to infer that the camera is likely both motionless and facing a fixed surface (e.g., a table), and that speaker phone mode be therefore be activated.

Part III: Building a Library or Catalog of Previously Captured Images

Figure 5:
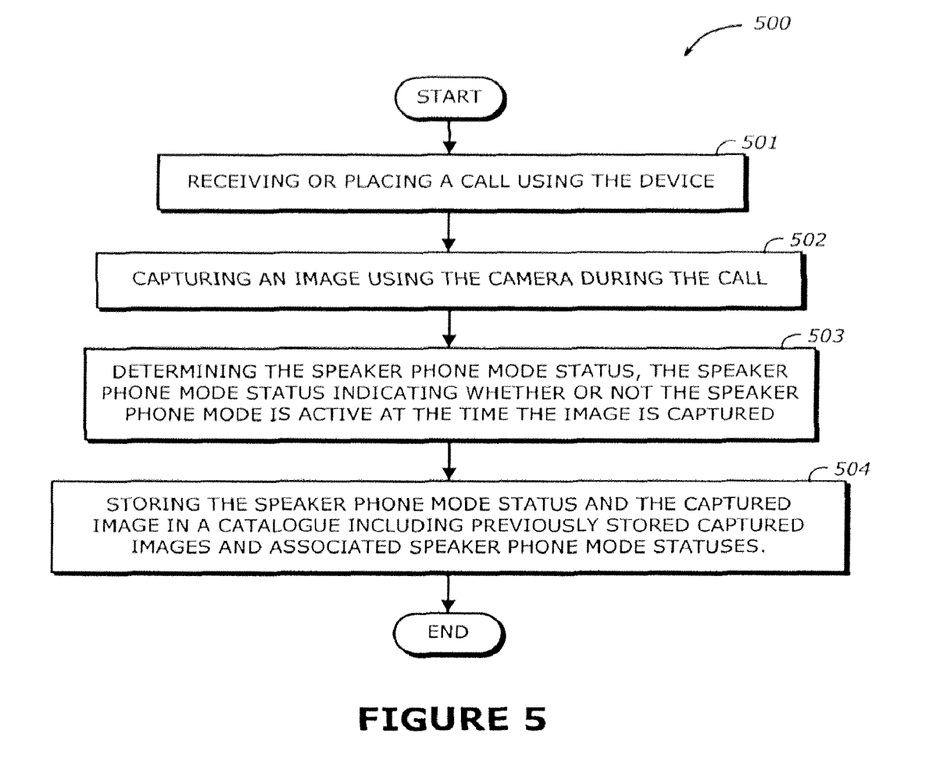
FIG. 5 shows a flow chart of one embodiment of a method for building a catalog or library of captured images that are associated with different instances of speaker phone mode usage.

As discussed above, the device may be trained or learn about the different situations in which the speaker phone mode is used. Referring to FIG. 5, a flowchart of an embodiment of a method 500 for building a catalog or library of captured images that are associated with different instances of speaker phone mode usage is illustrated. The method 500 starts, at Block 501, by receiving or placing a call using the device. At Block 502, an image is automatically captured using the camera during the call. The image may be captured during the conversation phase of the call. At Block 503, the device determines the speaker phone mode status which indicates whether or not the speaker phone mode is activated at the lime the image is captured. Next, at Block 504, the speaker phone mode and the captured image are associated with each other and are stored in a library or catalog. In this manner, the catalog is built to contain a number of different captured images and their respective speaker phone mode status, including images of instances where speaker phone mode was active, and images of other instances where speaker phone mode was not active.

In another embodiment, the device may be trained manually in a manual training mode of operation. After being placed in speaker phone training mode, the user positions the device as it would be when using its speaker phone mode and then commands the camera to capture one or more images with the device in that position. For example, the user could place the device in a cup holder inside a vehicle (which may or may not be moving at the time). In training mode, a touch screen of the device may display the viewfinder and virtual shutter button of the digital camera functionality of the device. The user would then actuate the shutter button one or more times, to capture images of the scene before the camera lens, during training mode. Each of these captured images may then be associated (through some interaction of the user with a graphical user interface of the device for example) with speaker phone mode status being enabled, even though there was no call in progress while the images were being captured. They would then be added to storage in the above-mentioned library or catalog.

In yet another embodiment of manual training mode, the user can teach the device about situations where speaker phone mode should not be automatically activated. For example, the user could place the device in its holster attached to her belt. This might be a situation where the user would not want speaker phone mode to be automatically activated for an incoming call, because she would like to first determine the caller's identity, e.g. through caller ID information being displayed on the screen during the incoming call. The user would then actuate the shutter button one or more times, to capture images of the scene before the camera lens. Each of these captured images may then be associated (once again through some interaction of the user with a graphical user interface of the device for example) with speaker phone mode status being disabled. They would then be added to storage in the above-mentioned library or catalog.

Using the catalog, the device can then determine whether to activate the speaker phone mode in any given situation. For example, whenever a call is received or placed, and it has been detected that there is no connected headset, the device may automatically capture an image using the camera while receiving or placing the call. This captured image is compared to the previously stored images in the catalog. If the captured image matches a previously stored image, and the speaker phone mode status associated with this previously stored is ENABLED or ACTIVE, the device may automatically activate the speaker phone mode. However, if the captured image matches a previously stored image whose speaker phone mode status is DISABLED or INACTIVE, the device may not automatically activate the speaker phone mode during the call. Moreover, if the captured image does not match any previously stored image, the speaker phone mode may not be automatically activated.

The catalog of previously stored captured images may include images of various situations where the speaker phone mode was or was not enabled. For example, in one embodiment, the catalog of previously stored captured images includes images of the interior of the user's car (associated with speaker phone mode being disabled). The device may have automatically captured the images of the inside of the car or the user may have manually captured images of the locations where the user normally places the device in the car. The captured images of the inside of the car may include, for example, images of the cup holder, the steering wheel, and the passenger seat, all of which may have been associated with speaker phone mode status being ENABLED. Using the catalog, the device may automatically activate the speaker phone mode when a captured image is determined to match the previously stored images of the interior of the car.

In another embodiment, the accelerometer may be used to further confirm that the device is located in a car such that the speaker phone mode should automatically be activated. For example, if the captured image matches a previously stored image of the interior of the car, and the data output by the accelerometer indicates that the device is moving faster than a human being is able to run, the device will determine that it is likely that the user is driving a car. Accordingly, the device may, in that case, automatically activate the speaker phone mode.

If the data output by the accelerometer indicates that the device is moving faster than a human being is able to run, the device may check for exceptions. For example, if the user is riding the bus or a train, it is not desirable to automatically activate the speaker phone mode. The library or catalog of previously stored images may include images captured while the user is on public transit. These images may include images of the seats or windows on the train. Accordingly, if the captured image matches such images in the library or catalog, the device may not automatically activate the speaker phone mode.

In another embodiment, the catalog of previously stored images includes images of the inside of the user's hand. If the camera lens is located on the back face of the device, then when the user holds the device to the user's face, with the receiver on the device being adjacent to the user's ear, then speaker phone mode should be deactivated. In this position, the lens of camera on the device faces the inside of the user's hand. Accordingly, the images captured of the inside of the user's hand will be associated with the speaker phone mode being deactivated. As a result, if the device thereafter captures an image, when a call is placed or received, that matches a previously stored image of the inside of the user's hand, the device may not automatically activate the speaker phone mode for that call.

In yet another embodiment, the catalog of previously stored images includes images of the sides of the user's face. When using the speaker phone mode, users often hold the device backwards with the receiver facing the inside of the user's hand and speak into the microphone. In this position, the lens of the camera faces the side of the user's face. Accordingly, if the device captures an image when call is placed or received that matches a previously stored image of the side of the user's face, the speaker phone mode may be activated. Similarly, when the user holds the device to the user's ear, but mistakenly holds the device backwards, the receiver faces the inside of the user's hand and the lens of the camera faces the side of the user's face. In this situation, it may be desirable for the speaker phone to be activated to allow the user hear the caller as well as alert the user of his mistake.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hard-wired logic. Those operations might alternatively be performed by any combination of programmed computer components and custom hardware components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A machine-implemented method to enable speaker phone mode in a wireless communications device using a built-in camera of the device, comprising:
   receiving or placing a call using the device;
   determining that the call is being received or placed using the device;
   capturing an image using the camera if it is determined that the call is being placed or received;
   determining status of the speaker phone mode when the image is captured, the speaker phone mode status indicating whether or not the speaker phone mode is activated; and
   storing the speaker phone mode status and the captured image in a catalog including a plurality of previously stored captured images and associated speaker phone mode statuses.

2. The method of claim 1 further comprising:
   receiving or placing a second call using the device;
   determining that the second call is being received or placed using the device;
   capturing a second image using the camera if it is determined that the second call is being placed or received;
   comparing the second captured image to the plurality of previously stored captured images in the catalog; and
   activating speaker phone mode of the device for the call, based on the speaker phone mode status associated with one of the plurality of previously stored captured images that matches the second captured image.

3. The method of claim 1 wherein capturing an image using the camera while receiving or placing the call is performed automatically by the device.

4. The method of claim 1 further comprising:
   capturing a second image using the camera while receiving or placing the call in response to a manual command from a user;
   determining the status of the speaker phone mode when the second image is captured; and
   storing the speaker phone mode status associated with the second image and the second captured image in the catalog.

5. The method of claim 1 wherein the catalog including a plurality of previously stored captured images includes one or more images of the interior of a car and the speaker phone mode status associated with the one or more images of the interior of the car indicates that the speaker phone mode is activated.

6. The method of claim 1 wherein the catalog including a plurality of previously stored captured images includes one or more images of a side of a user's face and the speaker phone mode status associated with the one or more images of the side of the user's face indicates that the speaker phone mode is activated.

7. The method of claim 1 wherein the catalog including a plurality of previously stored captured images includes one or more images of the inside of a user's hand and the speaker phone mode status associated with the one or more images of the inside of the user's hand indicates that the speaker phone mode is activated.

8. An apparatus comprising:
   camera circuitry to capture an image;
   wireless communications circuitry;
   a processor coupled to the camera circuitry and the wireless communications circuitry; and
   memory coupled to the processor, wherein the memory stores instructions which when executed by the processor, automatically activate the camera circuitry if it is determined by the processor that a call is being placed or received and use the camera circuitry to capture an image,
   determine status of speaker phone mode when the image is captured, the speaker phone mode status indicating whether or not the speaker phone mode is activated for a call that uses the wireless communications circuitry, and
   store the speaker phone mode status and the captured image in a catalog including a plurality of previously stored captured images and associated speaker phone mode statuses.

9. The apparatus of claim 8 wherein the memory stores further instructions which when executed by the processor detect that a further call is being received or placed, activate the camera circuitry in response to detecting the further call and use it to capture a further image during the further call, compare the further image to previously stored captured images in the catalog, and determine whether or not to activate the speaker phone mode for the further call based on a result of the comparison.

10. The apparatus of claim 8,
   wherein the memory stores further instructions which when executed by the processor,
   place the apparatus in a speaker phone training mode, wherein in the training mode a) the camera circuitry is activated and a shutter button is enabled, b) an image is captured, using the camera circuitry, in response to manual actuation of the shutter button by a user of the apparatus, c) status of speaker phone mode of the apparatus is detected when the image is captured, the speaker phone mode status indicating whether or not the speaker phone mode is activated for a call that uses the wireless communications circuitry, and d) store the speaker phone mode status and the captured image in a catalog.

11. The apparatus of claim 10 wherein the memory stores further instructions which when executed by the processor detect that a further call is being received or placed, activate the camera circuitry in response to detecting the further call and use it to capture a further image during the further call, compare the further image to previously stored captured images in the catalog, and determine whether or not to activate the speaker phone mode for the further call based on a result of the comparison.

* * * * *